United States Patent
Vanni et al.

(10) Patent No.: US 10,520,040 B2
(45) Date of Patent: Dec. 31, 2019

(54) SPRING RETAINER FOR ARC SPRING OF A CLUTCH

(71) Applicant: SCHAEFFLER TECHNOLOGIES AG & CO. KG, Herzogenaurach (DE)

(72) Inventors: Jeremy Vanni, Wooster, OH (US); Andrew Derhammer, Wadsworth, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 33 days.

(21) Appl. No.: 15/819,177

(22) Filed: Nov. 21, 2017

(65) Prior Publication Data
US 2019/0154090 A1    May 23, 2019

(51) Int. Cl.
*F16D 13/64* (2006.01)
*F16H 45/02* (2006.01)
*F16H 41/24* (2006.01)

(52) U.S. Cl.
CPC ............. *F16D 13/64* (2013.01); *F16H 41/24* (2013.01); *F16H 45/02* (2013.01); *F16H 2045/0205* (2013.01); *F16H 2045/0221* (2013.01); *F16H 2045/0226* (2013.01); *F16H 2045/0273* (2013.01); *F16H 2045/0294* (2013.01)

(58) Field of Classification Search
CPC .................................................. F16F 15/12326
See application file for complete search history.

(56) References Cited

U.S. PATENT DOCUMENTS

| | | | | |
|---|---|---|---|---|
| 4,959,039 A | * | 9/1990 | Naudin | F16F 15/12333 192/205 |
| 5,052,244 A | * | 10/1991 | Kamiya | F16F 15/13446 192/205 |
| 5,242,328 A | * | 9/1993 | Friedmann | F16F 15/13128 192/204 |
| 5,810,140 A | * | 9/1998 | Billet | F16H 45/02 192/205 |
| 8,287,389 B2 | | 10/2012 | Kneidel et al. | |
| 2011/0011691 A1 | * | 1/2011 | Tomiyama | F16H 45/02 192/3.29 |
| 2012/0190462 A1 | * | 7/2012 | Wahl | F16F 15/12326 464/68.1 |
| 2013/0324267 A1 | * | 12/2013 | Blough | F16F 15/1213 464/67.1 |
| 2015/0260257 A1 | | 9/2015 | Jimenez Perez Mitre et al. | |
| 2016/0025147 A1 | | 1/2016 | Dinger | |

(Continued)

FOREIGN PATENT DOCUMENTS

DE    102013003627 A1 *    9/2014    ........ F16F 15/12326

OTHER PUBLICATIONS

DE102013003627 translation (Year: 2014).*
International Search Report and Written Opinion for PCT Application No. PCT/US2018/060616, dated Mar. 5, 2019, 11 pages.

*Primary Examiner* — Timothy Hannon
(74) *Attorney, Agent, or Firm* — Brooks Kushman, P.C.

(57) ABSTRACT

A disk assembly of a torque converter bypass clutch includes a disk defining a circular spring cavity and a plurality of arc springs circumferentially arranged in the cavity with gaps defined between adjacent ones of the arc springs. Each of the springs includes an end cap fitted on an end of the spring. Spring connectors are each disposed in one of the gaps and include an end received within a corresponding one of the end caps.

18 Claims, 4 Drawing Sheets

(56) References Cited

U.S. PATENT DOCUMENTS

2016/0084343 A1    3/2016   Shirasuna et al.
2016/0201729 A1    7/2016   Uehara et al.
2017/0276211 A1*   9/2017   Osumi .............. F16F 15/12326

* cited by examiner

SPRING RETAINER FOR ARC SPRING OF A CLUTCH

TECHNICAL FIELD

The present disclosure relates to bypass clutches for torque converters and more specifically to spring retainers for securing arc springs of the bypass clutch.

BACKGROUND

Motor vehicles with automatic transmissions typically include a torque converter used to transmit engine power to an input shaft of the transmission. To improve fuel economy, among other things, many torque converters include a bypass clutch that couples the input shaft to the case of the torque converter. The torque converter includes one or more dampeners that smooth power spikes of the engine to reduce noise and vibrations.

SUMMARY

According to one embodiment, a disk assembly of a torque converter bypass clutch includes a disk defining a circular spring cavity and a plurality of arc springs circumferentially arranged in the cavity with gaps defined between adjacent ones of the arc springs. Each of the springs includes an end cap fitted on an end of the spring. The end caps define an interior. Spring connectors are each disposed in one of the gaps and include a first end received within a first corresponding one of the interiors.

According to another embodiment, a clutch for a torque converter includes a clutch disk and a driven disk that defines a circular spring cavity. A plurality of arc springs are circumferentially arranged in the spring cavity with gaps defined between adjacent ones of the arc springs. The arc springs transmit torque from the clutch disk to the driven disk when the bypass clutch is engaged. Each of the arc springs including an end cap. Spring connectors are each disposed in one of the gaps and have an end received within the end cap and a central portion connected to the clutch disk.

According to yet another embodiment, a torque converter includes a case having an impeller, a turbine fixed to a damper flange, and a bypass clutch. The bypass clutch includes a clutch disk configured to frictionally engage the case when the bypass clutch is engaged and a driven disk connected to the damper flange and configured to transmit rotation of the case to the damper flange when the bypass clutch is engaged. The driven disk defines a circular spring cavity. At least first and second arc springs are disposed in the spring cavity. Each arc spring has opposing open ends and an end cap received within each of the open ends. A spring connector is disposed between the first and second springs and has a first end received within a corresponding one of the end caps of the first spring, a second end received within a corresponding one of the end caps of the second spring, and a central portion connected to the clutch disk so that rotation of the clutch disk is transmitted into the driven disk via the arc springs.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
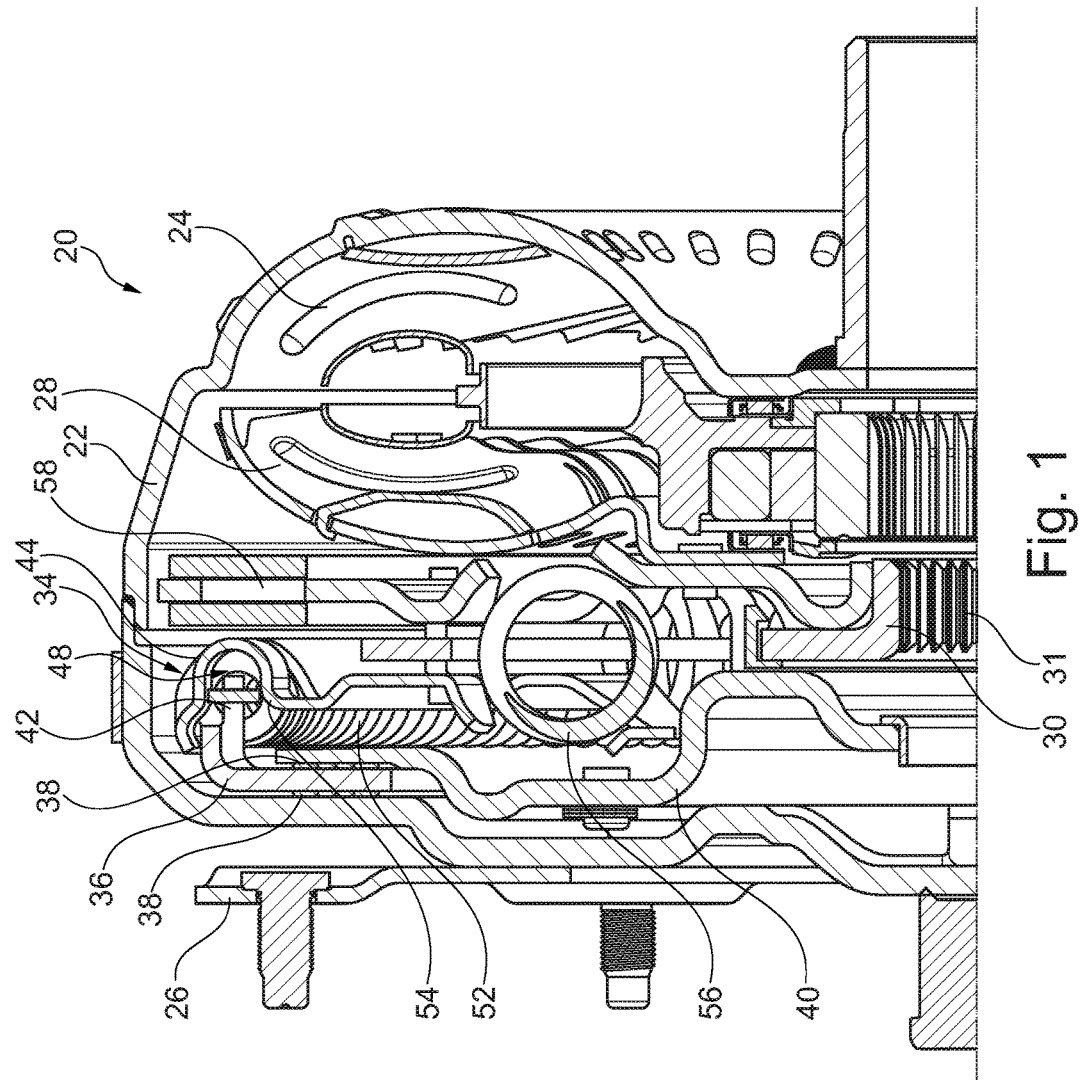
FIG. 1 is a cross-sectional side view of a torque converter.

Referring to FIG. 1, a torque converter 20 may be coupled between an engine and a transmission. The torque converter 20 includes a case 22 having an impeller 24 fixed thereto. The case 22 may be coupled to the engine by a flex plate 26 or other type of bracketry. A turbine 28 is disposed in the case 22 adjacent to the impeller 24. The impeller 24 and the turbine 28 are configured to fluidly couple and transmit power from the impeller 24 to the turbine 28 when the impeller 24 rotates faster than the turbine 28. The turbine 28 may be attached to a damper flange 30. The damper flange 30 couples to an input shaft of the transmission. For example, the damper flange 30 may include an internal spline 31 that receive external splines of the input shaft.

The torque converter 20 includes a bypass clutch 34 configured to mechanically couple the damper flange 30 to the case 22 to bypass the fluid coupling between the impeller 24 and the turbine 28. The clutch 34 includes a clutch disk 36 and a driven disk 44 that are supported for rotation about a center line of the torque converter 20 and may be concentric with each other. The clutch disk 36 includes one or more friction surfaces 38. The illustrated clutch disk 36 includes a first friction surface that engages with the case 22 and a second friction surface that engages with the piston 40.

The bypass clutch 34 is engaged and disengaged by actuating the piston 40 towards or away from the clutch disk 36. The piston 40 may be hydraulically actuated. The bypass clutch 34 is engaged (locked) by stroking the piston to compress the first friction surface against the case 22 and the second friction surface against the piston. The bypass clutch 34 is considered fully locked when the clutch disk 36 rotates in substantial unison with the case 22. The driven disk 44 is connected to the clutch disk 36 by arc springs 52. The clutch disk 36 includes radially extending portions 42 that connect with one end of the arc springs 52 and the driven disk 44 includes abutments 54 that engage with the other ends of the arc springs 52. The arc springs 52 provided a damper between the engine and the input shaft of the transmission to absorb torque spikes produced by engine combustion as well as improve noise, vibrations and harshness (NVH).

The driven disk 44 includes a spring cavity 48 that encircles the periphery 50 of the driven disk 44. The spring cavity 48 may be C-shaped and sized to receive the arc springs 52 therein. The walls of the spring cavity 48 may define the abutments 54. The driven disk 44 is connected to the damper flange 30 by another damper 56. The torque converter 20 may also include a pendulum damper 58 that is also connected to the damper flange 30.

During operation of the torque converter, the driven disk rotates generating centrifugal forces that urge the arc springs radially outward. Many current designs fail to adequately restrain the arc springs allowing the generated centrifugal forces to push the arc springs against the driven plate causing hysteresis. Hysteresis occurs due to friction between the spring and the driven disk. The friction inhibits movement of the arc springs relative to the driven disk, which increase the spring rate from a designed spring rate to an effective spring rate. (The effective spring rate can four times as high as the design spring rate when engine speed is high.) To compensate for NVH due to hysteresis, these torque converters include a relatively large pendulum damper to further dampen the system and mask inefficiencies of the arc springs.

Hysteresis reduces the NVH performance of the arc springs. The bypass clutch 34 includes features for restraining the arc springs 52 in the radial direction to reduce contact between the driven disk 44 and the arc springs 52. This will be described in more detail below.

Figure 2:
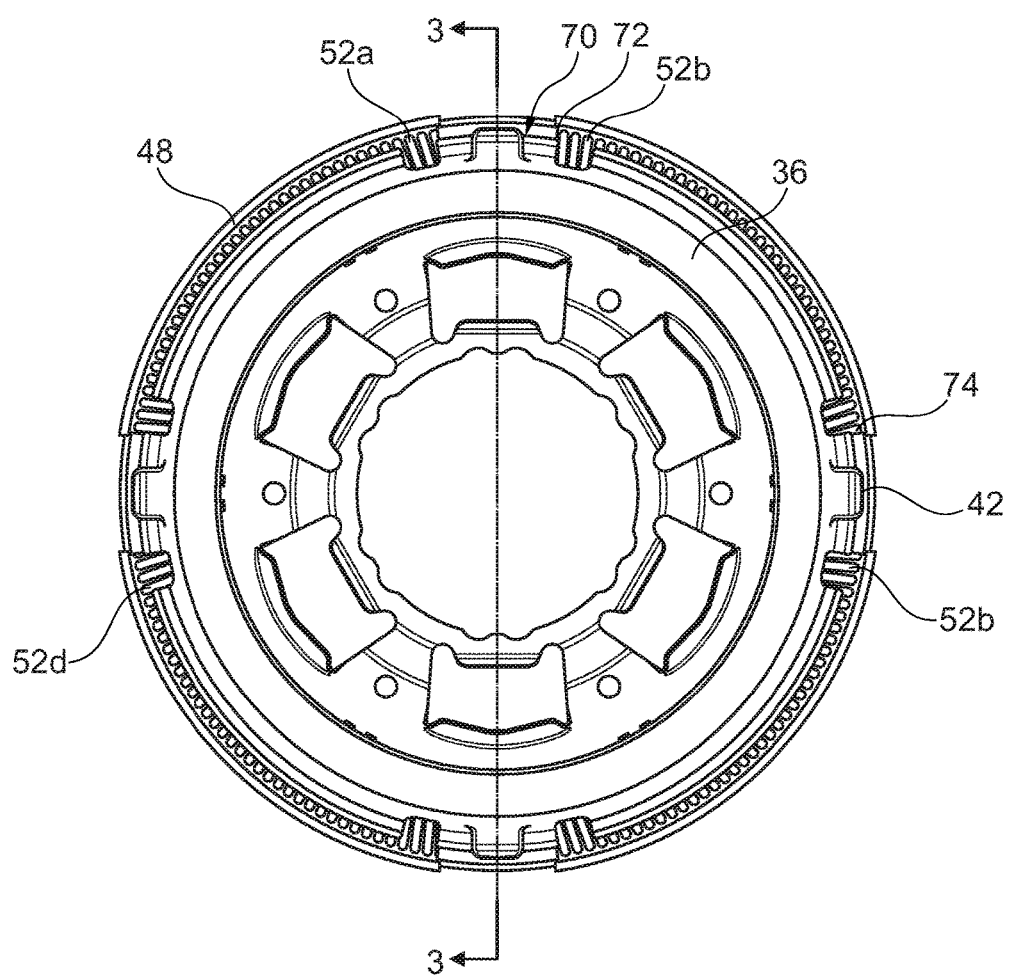
FIG. 2 is a front view of a clutch of the torque converter.
Figure 3:
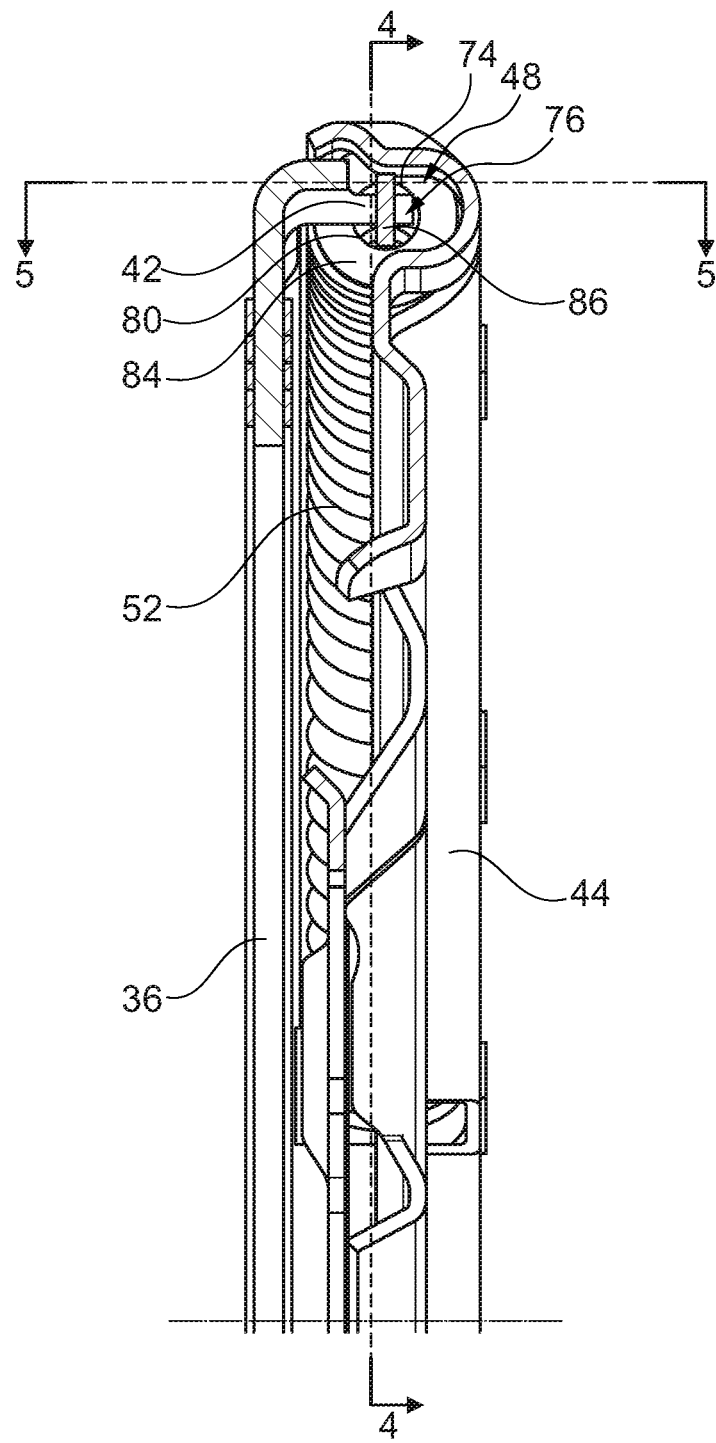
FIG. 3 is a cross-sectional side view of the clutch along cutline 3-3.

Referring to FIGS. 2 and 3, the arc springs 52 are circumferentially arranged within the spring cavity 48 with gaps 70 defined between adjacent ones of the arc springs 52. In the illustrated embodiment, four arc springs (52a, 52b, 52c, and 52d) are used to transfer torque from the clutch disk 36 to the driven disk 44. The radially extending portions 42 are circumferentially arranged around the perimeter of the clutch disk 36 and located to align with the gaps 70. In the illustrated embodiment, the clutch disk 36 includes four radially extending portions that align with the four gaps. The portions 42 extend into the spring cavity 48 to connect with the arc springs 52.

Each arc spring 52 may be formed of a coiled-metal body having a first end 72 and second end 74. The arc spring 52 may be circular and have a hollow center that defines a passageway 76 extending between the ends 72, 74.

Figure 4:
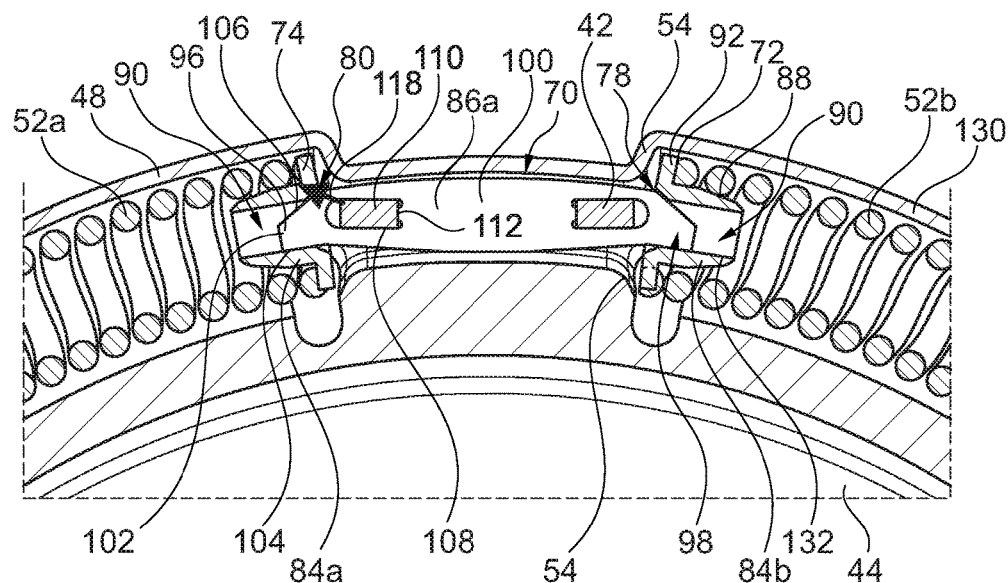
FIG. 4 is a cross-sectional front view of the clutch along cutline 4-4.
Figure 5:
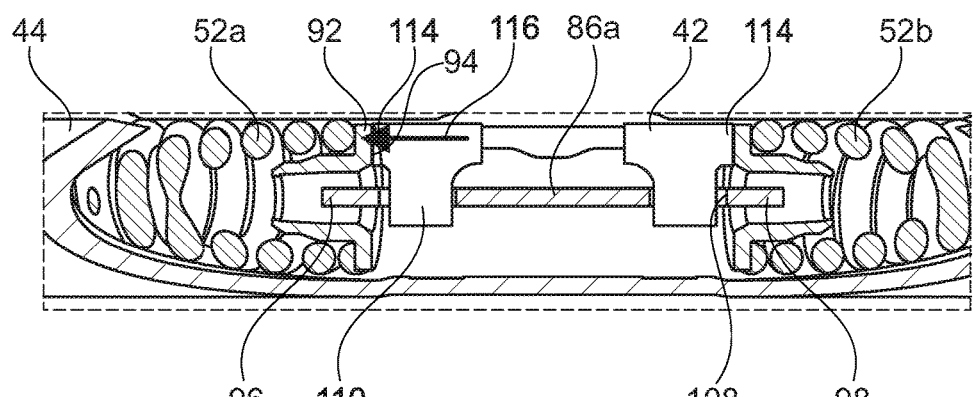
FIG. 5 is a cross-sectional top view of the clutch along cutline 5-5.

Referring to FIGS. 3, 4, and 5, the first end 72 defines one opening 78 of the passageway 76 and the second end 74 defines the other opening 80. An end cap 84 is attached to each of the ends 72, 74, e.g., the end caps are press fit to the springs. The end caps 84 may have a circular cross section. Each end cap 84 may include an insertion portion 88 and a flange portion 92. The insertion portion 88 may be tapered and may have a generally frustoconical shape to facilitate insertion of the end cap 84 into the passageway 76. The flange portion 92 has a diameter that is larger than the insertion portion 88 and is not received within the passageway 76. Instead, the flange portion 92 abuts the end of the arc spring 52. The flange portion 92 may have a diameter that approximates the diameter of the arc spring 52. A central bore 90 may extend through the end cap 84 or a blind hole may be formed.

When assembled, the arc springs 52 are interconnected with each other and to the clutch disk 36 by spring connectors 86. Each spring connector 86 is disposed in one of the gaps 70 and is interposed between adjacent springs. The spring connectors 86 may be an elongate piece of metal or other material. The spring connectors 86 may have a height extending in the radial direction of the driven disk 44, a width extending in an axial direction of the torque converter 20, and a length extending in a circumferential direction of the disk 44. The spring connectors 86 may have a rectangular cross section in which the height is larger than the width. The spring connectors 86 may be arcuate and have a curvature that substantially matches the curvature of the driven disk 44. In an alternative embodiment, each spring connector 86 may be formed of multiple stacked plates that are either all the same, or different sizes to match a radius of curvature of the central bore 90.

For example, spring connector 86a is disposed between arc springs 52a and 52b. The spring connector 86a includes a first end 96 disposed within the central bore 90 of end cap 84a, a second end 98 disposed within the central bore 90 of end cap 84b, and a central portion 100 extending between the ends. Each of the ends 96, 98 may include a nose 102, an inboard surface 104, and an outboard surface 106. The outboard surface 106 is angled at an oblique angle relative to the radial direction of the driven disk 44. This facilitates insertion of the spring connector 86a into the end caps 84a and 84b.

The central portion 100 connects with a corresponding one of the radially extending portions 42. The central portion 100 may define one or more slots 108 that receive one or more fingers 110 of the radially extending portion 42. In the illustrated embodiment, the central portion 100 defines a pair of slots 108 that receives a pair of fingers 110. An interior wall of the slots may define a tab 112. The tab locates the spring connect rotationally. The slots 108 may be elongated in the length direction of the spring connector 86. The other spring connectors 86 may have a structure that is the same or similar to spring connector 86a.

Each finger 110 may include a tab 114 adjacent to one of the end caps 84. The tab 114 is configured to engage with a plate-engaging surface 94 of the flange portion 92 to transfer torque from the clutch disk 36 into the arc spring 52.

Torque is transferred from the radially extending portions 42 of the clutch disk 36 to the arc springs 52 via the spring connectors 86. Assuming that the engine crankshaft rotates counterclockwise, torque flows from the fingers 110 and into the arc spring 52a via a primary path 116 and secondary path 118. The primary path 116 is formed by the tab 114 engaging with the flange portion 92 of end cap 84a. The secondary path 118 flows from the fingers 110, into the spring connector 86a via engagement of the fingers 110 and a wall of slots 108, and from the end 96 into the end cap 84a. The other arc springs have same or similar torque flow paths.

The torque compresses the arc springs 52 forcing the first ends 72 into engagement with the driven disk 44. Focusing on arc spring 52b as an example, the end cap 84b engages with the abutments 54 to create a torque flow path that transfers torque from the arc spring 52b into the driven disk 44. More specifically, the flange portion 92 includes an abutment-engaging side that contacts the abutments 54 when the arc spring 52b is compressed by torque from the clutch disk 36.

As explained above, rotation of the bypass clutch 34 urges the arc springs 52 radially outward. To reduce the above described hysteresis of the arc springs, the ends 96 and 98 of the spring connector 86 are received within corresponding central bores 90 of the end caps 84. The spring connectors 86 are radially retained by the fingers 110. The inboard surfaces 104 engage with corresponding interior walls 132 of the end caps 84 to radially restrain the ends 72, 74 of the arc springs 52. This reduces friction between the arc springs 52 and the outer wall 130 of the driven disk 44 so that the effective spring rate of the arc springs 52 more closely approximates the design spring rate as compared to the above described previous designs. Reducing hysteresis by employing the above described spring connectors 86 and end caps 84 improves performance of the pendulum damper 58 and may allow for the pendulum damper 58 to be downsized or omitted depending upon application of the torque converter 20.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch for a torque converter, the clutch comprising:
   a clutch disk including a friction material and defining a plurality of radially extending portions circumferentially spaced from each other, each of the radially extending portions having an axially extending finger projecting therefrom;
   a driven disk defining a circular spring cavity;
   a plurality of arc springs that transmit torque from the clutch disk to the driven disk when the clutch disk is engaged, the arc springs being circumferentially arranged in the spring cavity between the radially extending portions with gaps defined between adjacent ones of the arc springs, wherein each of the arc springs includes a pair of opposing ends defining an opening;
   a plurality of end caps each having a flange portion and a tapered portion, the tapered portion defining a central bore, wherein each end of the arc springs has a corresponding one of the end caps attached thereto with the tapered portion disposed within the opening and the flange portion disposed against the end, and wherein the flange portions include plate-engaging surfaces that are disposed against corresponding ones of the radially extending portions creating primary torque paths from the clutch disk to the arc springs; and
   arcuate spring connectors having a curvature that substantially matches a curvature of the driven disk, the spring connectors including a central portion defining a slot and opposing ends each having a straight inboard side, a nose extending radially from the inboard side, and an outboard side extending from the nose to the central portion at an oblique angle relative to a radial direction of the driven disk, each of the spring connectors being disposed in one of the gaps with a corresponding one of the fingers disposed in the slot and with the ends each received within the central bore of a corresponding one of the end caps with the inboard side engaging with a periphery of the central bore and with the outboard side engaging with the periphery of the central bore to create secondary torque paths from the clutch disk to the arc springs.

2. The clutch of claim 1, wherein each of the spring connectors is an elongate member having a height extending in the radial direction of the of the driven disk and a width extending in an axial direction of the torque converter, wherein the height is larger than the width.

3. The clutch of claim 2, wherein each of the spring connectors has a rectangular cross-section.

4. The clutch of claim 1, wherein the driven disk defines abutments located in the gaps and arranged to engage with the flange portions.

5. A torque converter comprising:
   a case including an impeller;
   a turbine fixed to a damper flange; and
   a bypass clutch including:
   a clutch disk configured to frictionally engage the case when the bypass clutch is engaged, the clutch disk defining at least one radially extending portion having opposing first and second sides,
   a driven disk connected to the damper flange and configured to transmit rotation of the case to the damper flange when the bypass clutch is engaged, wherein the driven disk defines a circular spring cavity,
   at least first and second arc springs disposed in the spring cavity, each arc spring having opposing first and second open ends, wherein the first ends are disposed against the first sides and the second ends are disposed against the second sides, and
   a spring connector disposed between the first and second springs, the spring connector including an elongate member having a height extending in the radial direction of the of the driven disk and a width extending in an axial direction of the torque converter, wherein the height is larger than the width, the elongate member having a first end received within the first end of the first spring, a second end received within the second end of the second spring, and a central portion connected to the radially extending portion so that rotation of the clutch disk is transmitted into the driven disk via the arc springs.

6. The torque converter of claim 5, wherein the elongate member has a rectangular cross section.

7. The torque converter of claim 5, wherein the radially extending portion further has a finger, and the central portion further defines a slot that receives the finger.

8. The torque converter of claim 5 further comprising end caps disposed in the first and second open ends of the first and second springs.

9. The torque converter of claim 8, wherein each of the end caps has a tapered portion received within a corresponding one of the open ends and a flange portion adjacent the corresponding one of the open ends.

10. The torque converter of claim 9, wherein the driven disk defines an abutment arranged to engage with a corresponding one of the flange portions.

11. The torque converter of claim 8, wherein each of the end caps defines a central bore, and wherein the first end of the spring connector defines an inboard side, an outboard side, and a nose extending therebetween, wherein the inboard side is disposed against a wall of a corresponding one of the central bores to restrain outward radial movement of the first spring.

12. The torque converter of claim 11, wherein the inboard side is straight.

13. The torque converter of claim 11, wherein the outboard side is oriented at an oblique angle relative to a radial direction of the driven disk.

14. The torque converter of claim 5, wherein the circular spring cavity is located at a periphery of the driven disk.

15. A disk assembly of a torque converter bypass clutch, the disk assembly comprising:
   a disk defining a circular spring cavity having abutments located on an inner diameter of the spring cavity, wherein the abutments are circumferentially spaced from each other;
   a plurality of arc springs circumferentially arranged in the cavity with gaps defined between adjacent ones of the arc springs, each of the springs including an end cap fitted on an end of the spring, wherein each end cap defines an interior and a flange portion disposed against a corresponding one of the abutments; and spring connectors each disposed in one of the gaps and including a first end received within a first corresponding one of the interiors, each of the spring connectors further including an elongate member having a height extending in a radial direction of the disk and a width extending in an axial direction of the torque converter, wherein the height is larger than the width.

16. The disk assembly of claim 15, wherein each of the springs further includes a second end cap fitted on an opposing end of the spring, and each of the spring connectors further includes a second end received within an interior of a corresponding one of the second end caps.

17. The disk assembly of claim 15, wherein the spring connectors have a rectangular cross section.

18. The disk assembly of claim 15, wherein the first ends of the spring connectors each defines a straight inboard side.

* * * * *